United States Patent [19]

Roe

[11] Patent Number: 5,613,750
[45] Date of Patent: Mar. 25, 1997

[54] FLUORESCENT BACKLIGHTING DEVICE FOR AN INSTRUMENT PANEL

[75] Inventor: Pamela A. Roe, Kokomo, Ind.

[73] Assignee: Delco Electronics Corporation, Kokomo, Ind.

[21] Appl. No.: 334,997

[22] Filed: Nov. 7, 1994

[51] Int. Cl.$^6$ .................................................. G01D 11/28
[52] U.S. Cl. .............................. 362/26; 362/31; 362/32; 362/260; 362/223; 362/256
[58] Field of Search .............................. 362/26, 31, 32, 362/84, 260, 223, 256, 255

[56] References Cited

U.S. PATENT DOCUMENTS

| | | |
|---|---|---|
| 3,590,774 | 7/1971 | Solow ........................................ 362/84 |
| 4,924,612 | 5/1990 | Kopelman .................................. 40/547 |
| 5,128,846 | 7/1992 | Mills et al. ................................. 362/31 |
| 5,190,365 | 3/1993 | Cordy et al. ............................... 362/26 |
| 5,268,823 | 12/1993 | Yergenson .................................. 362/26 |

Primary Examiner—Ira S. Lazarus
Assistant Examiner—Alfred Basichas
Attorney, Agent, or Firm—Jimmy L. Funke

[57] ABSTRACT

A backlighting device for a backlit graphic display used in an instrument panel of an automobile. The backlighting system involves the use of a fluorescent light source and a lightpipe which is tailored for use with the fluorescent light source so as to promote uniform transmission of light to the display, and to achieve a suitable level of light intensity when backlit by a minimal number of light sources. The backlighting system further involves forming the lightpipe from a material which readily transmits light, and preferably is sensitive to ultraviolet radiation, so as to enhance the lighting capability of the light source while also producing an aesthetically pleasing appearance for the display.

12 Claims, 1 Drawing Sheet

FLUORESCENT BACKLIGHTING DEVICE FOR AN INSTRUMENT PANEL

The present invention generally relates to backlit graphic displays and buttons used in an instrument panel of an automobile. More particularly, this invention relates to a backlighting system composed of a light source and lightpipe combination, in which the material and configuration of the lightpipe are tailored for use with a fluorescent light as the light source for illuminating the buttons of a display.

BACKGROUND OF THE INVENTION

Illuminated graphic displays and buttons for automotive applications, such as the controls for a heating, ventilating and air conditioning system (HVAC), often have backlit buttons, each of which identifies and controls a function of the system. Such backlit components have an incandescent light source which is positioned behind the button in order to make an insignia formed on the button visible in the dark, necessitating that the insignia be capable of receiving light from the light source. A common approach is to form buttons from a white translucent material or from a transparent plastic material which is painted white to form a white translucent layer over the transparent substrate. The buttons are then painted black to form an opaque black cover layer, which is then selectively lased away to expose a portion of the underlying white translucent substrate, which serves as the insignia.

The translucent or transparent nature of the button maximizes the transmission of light from the incandescent light source for night time viewing, while the white translucent material or layer contributes graphics whiteness by reflecting light, such that the insignia can be visible under natural lighting conditions during daylight hours.

A difficulty in the design of backlit displays is the attainment of an adequate lighting intensity level while avoiding different backlighting intensities between adjacent buttons, which would cause irregular illumination intensities within a display group. This is particularly true with buttons of a backlit display which, for cost and design efficiencies, share one or more light sources. In order to reduce the variability of lighting intensity, such displays often incorporate lightpipes for the purpose of distributing light equally among the buttons. Though much effort has been directed toward optimizing the capability of lightpipes, uniform backlighting of each and every button is very difficult due to size and location constraints. As a result, it is at times necessary to apply facets and painted patterns to lightpipes in order to increase the light intensity directed to relatively dim areas. In particular, reflectors and additional lamps have been required at times to enhance the light intensity. In contrast, excessively bright areas have been attenuated with the use of printed halftone patterns behind the individual insignia.

Another challenge of current backlighting technology is the desire to produce a backlighting effect having an aesthetically pleasing appearance. In particular, the conventional use of incandescent light sources often tends to contribute a yellowish-white color to the display, which in some applications may be undesirable or unappealing to an observer. Consequently, color appliques and light filters are often employed to alter the color of the lighting effect produced by the light source. Other known shortcomings include poor reliability and short service life of incandescent light sources, and the requirement to dissipate the considerable amount of heat which these light sources generate.

From the above, it can be seen that significant shortcomings exist in the current technology for light sources and the means by which the light produced is delivered to a display. Accordingly, it would be desirable if a backlighting system existed which was highly reliable and produced an aesthetically pleasing backlighting effect for a backlit display of an automobile. Furthermore, such a system would require a minimal number of light sources, yet produce minimal variability in backlighting intensity between backlit components of a display at reduced power levels and operating temperatures for a given desired backlighting intensity.

SUMMARY OF THE INVENTION

It is an object of this invention to provide a backlighting system for a group of backlit components within a display panel, in which the backlighting system produces minimal variability in backlighting intensity between the components.

It is a further object of this invention that the backlighting system utilize a fluorescent light source and a lightpipe which is tailored for use with the fluorescent light source so as to promote the transmission of light to the display panel, and achieve a suitable level of light intensity when backlit by a minimal number of light sources.

It is a yet further object of this invention that the backlighting system be characterized by reduced power consumption and lower operating temperatures for a given level of light intensity.

It is another object of this invention that such a backlighting system produce an aesthetically pleasing backlighting effect for the display panel.

It is yet another object of this invention that such a backlighting system be highly reliable and have a long service life.

In accordance with a preferred embodiment of this invention, these and other objects and advantages are accomplished as follows.

According to the present invention, there is provided a backlighting system for a backlit graphic display used in an instrument panel of an automobile. In particular, the backlighting system involves the use of a fluorescent light source and a lightpipe which is tailored for use with the fluorescent light source so as to promote uniform transmission of light to the display, and achieve a suitable level of light intensity when backlit by a minimal number of light sources. The backlighting system further involves forming the lightpipe from a material which readily transmits light, and in a preferred embodiment, converts a shorter ultraviolet (UV) wavelength to a longer visible wavelength.

Generally, with the backlighting system of this invention, a fluorescent light source emits radiation in the visible spectrum, though for some applications the fluorescent light source is preferably a UV fluorescent lamp which emits a large portion of its light in the ultraviolet region. The system further includes a lightpipe which is configured for optimum lighting efficiency. The lightpipe is formed to have a body, a portion of which is preferably adapted and configured to transmit light from the body of the lightpipe to an individual backlit component of the display panel served by the backlighting system. The lightpipe is formed from a translucent or transparent material, and more preferably a material which absorbs the ultraviolet radiation emitted by the fluorescent light source, so as to convert the shorter ultraviolet waves to longer visible waves.

In accordance with this invention, the fluorescent light source is disposed in a passage formed in the body of the lightpipe, such that at least a portion of the lightpipe body contacts and envelops at least a portion of the fluorescent light source. For example, the light source may be disposed in a channel formed in a surface of the lightpipe. More preferably, the light source is disposed within a bore formed within the lightpipe such that the light source is entirely surrounded by the body in order to promote optimum uniform lighting characteristics. As such, light emitted from the fluorescent light source is transmitted through the body of the lightpipe to the backlit component. Using the light source and lightpipe of this invention, a display panel of backlit components will exhibit substantially equal backlighting intensities in part due to each backlit component being served by a portion of the lightpipe. Notably, suitable uniformity and intensity within a display group of buttons can be achieved with a single light source, due to the configuration of the lightpipe and the lighting characteristics of the fluorescent light source.

Another advantage of the present invention is the capability for producing an aesthetically pleasing backlighting effect for a display panel. It has been determined that the fluorescent light source and lightpipe of this invention produces a bluish white light which is suitably vivid for many applications, yet can be readily altered by utilizing a dye during the manufacture of the lightpipe, such that the dye alters the color of the light emitted behind the backlit components. Notably, use of the dye eliminates the previous requirement for color appliques and light filters used with incandescent lamps. Further enhancement of the backlighting effect is achieved by forming the lightpipe from a material which is sensitive to ultraviolet radiation emitted when using a UV fluorescent light source.

In addition, higher lighting intensities are achieved for the same power consumption with the fluorescent light source of this invention as compared to conventional incandescent lamps, yet at a lower operating temperature and therefore a reduced requirement for heat dissipation. Furthermore, the fluorescent light source is generally a more reliable light source, with the potential for a long service life as compared to conventional incandescent lamps.

Other objects and advantages of this invention will be better appreciated from the following detailed description.

BRIEF DESCRIPTION OF THE DRAWINGS

The above and other advantages of this invention will become more apparent from the following description taken in conjunction with the accompanying drawings, in which.

DETAILED DESCRIPTION OF THE INVENTION

Figure 1:
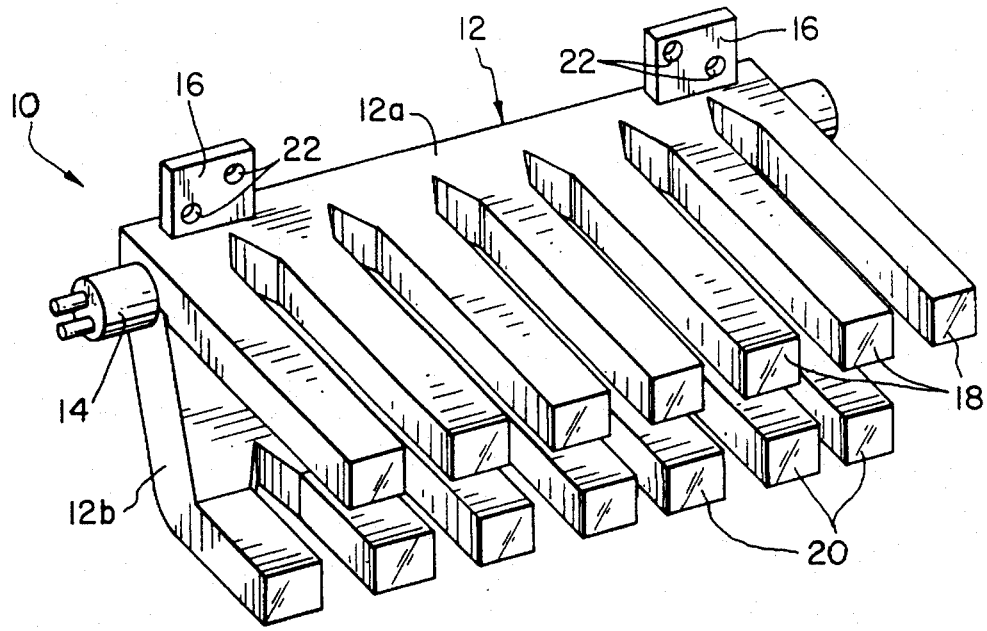
FIG. 1 shows in perspective a backlighting device in accordance with a preferred embodiment of this invention.
Figure 2:
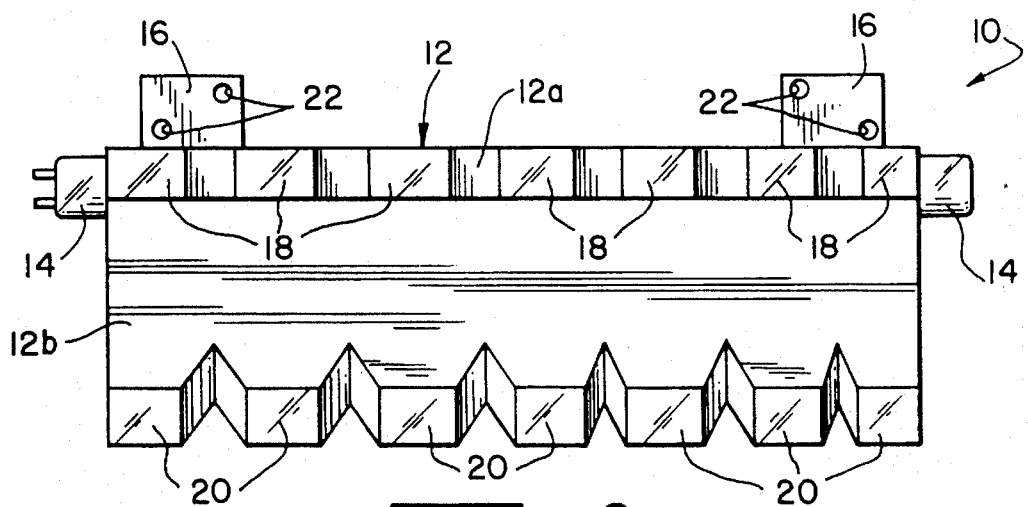
FIG. 2 is a frontal view of the backlighting device of FIG. 1.
Figure 3:
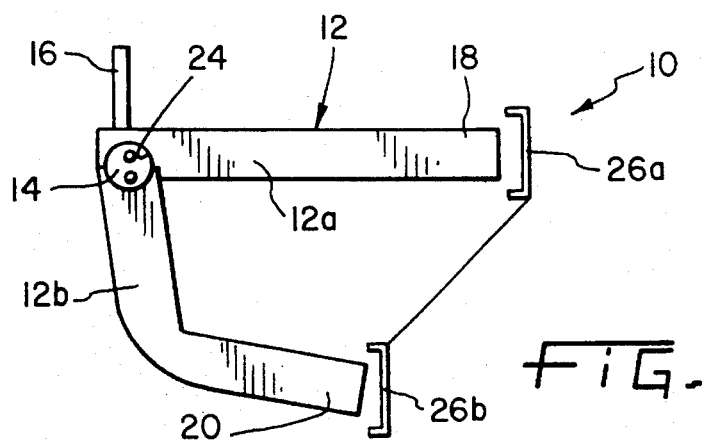
FIG. 3 is an end view of the backlighting device of FIG. 1.

With reference to FIGS. 1 through 3, the present invention is directed to a backlighting device 10 which is suitable for backlighting a graphic display used in an instrument panel of an automobile. As an example, the backlighting device 10 is particularly suited for backlighting the buttons of a control panel for an automobile's heating, ventilating and air conditioning (HVAC) system, though other foreseeable applications include audio and instrument clusters for automobiles. Accordingly, the teachings of this invention are directed to backlighting systems in general, and are not to be interpreted as being limited to any particular application.

As shown in the Figures, the backlighting device 10 is composed of a lightpipe 12 and a lamp 14. In particular, the lightpipe 12 is specifically tailored to obtain optimum lighting efficiencies for a display when the lamp 14 is a fluorescent light. Furthermore, the lightpipe 12 is designed to achieve a suitable level of backlighting intensity when only a single lamp 14 is used in the device 10. In particular, the lightpipe 12 is configured to have a generally U-shaped cross-section, with the lamp 14 being located at the base of the "U", as illustrated in FIG. 3. To accommodate the shape of the fluorescent lamp 14, the lightpipe 12 preferably has a generally elongate shape, and includes an upper member 12a and a lower member 12b. For convenience, peg holders 22 can be formed in tabs 16 which extend from the upper member 12a for the purpose of mounting the device 10 behind a display.

The lightpipe 12 preferably has a number of fingers arranged in arrays, such as the two rows of fingers 18 and 20 shown in the Figures. As illustrated, a first set of fingers 18 projects from the upper member 12a of the lightpipe 12 and a second set of fingers 20 projects from the lower member 12b of the lightpipe 12. Each finger 18 and 20 is preferably adapted and configured to transmit light from the lamp 14 to an individual button 26a or 26b of the display panel served by the backlighting device 10, as suggested by FIG. 3, though it is foreseeable that one or more buttons could be served by a single finger 18 or 20.

The lightpipe 12 of this invention can be adapted for various types of buttons and display panels. For example, the buttons 26a and 26b represented in FIG. 3 may be formed from a white translucent material over which an opaque cover layer is formed and later selectively lased to define an insignia in the surface of the button. With this type of construction, the light emitted by the lamp 14 is distributed by the lightpipe 12 through the fingers 18 and 20, and is thereafter transmitted through the white translucent material, such that the insignia is clearly visible by an observer for night viewing.

Those skilled in the art will recognize that the backlighting device 10 represented in the Figures is merely one example of numerous possible arrangements in which one or more backlit components could be illuminated by one or more devices 10, each of which could employ one or more lamps 14 in cooperation with one or more lightpipes 12 of any suitable design and configuration. Though the geometry of the lightpipe 12 and the type of lamp 14 are specific features of this invention, numerous possible variations in their design could be devised by one skilled in the art after having the benefit of the teachings of this invention.

According to this invention, the lamp 14 is preferably located intermediate the upper and lower members 12a and 12b of the lightpipe 12, such that the lamp 14 is surrounded by the lightpipe 12 in order to obtain optimum light efficiency. More preferably, and as shown in FIG. 3, the lamp 14 is disposed in a passage 24 formed by and between the upper and lower members 12a and 12b, and is oriented longitudinally to the lightpipe 12.

It has been determined that, for optimum intensity and backlighting uniformity, the lamp 14 is preferably enclosed within the lightpipe 14. Because the lamp 14 is a fluorescent lamp, and therefore operates at a cooler temperature than incandescent lamps, the lamp 14 is permitted to contact the lightpipe 12 so as to be firmly supported by the lightpipe 12. Accordingly, the diameter of the passage 24 can be roughly that of the lamp 14, which is available in preferred sizes of on the order of about one centimeter (approximately one half inch) and less.

While shown as being entirely enclosed within the body of the lightpipe 12, so as optimize the lighting efficiency of the device, it is foreseeable that the passage 24 could be formed as an elongate recess in the lightpipe 12, such that only a portion of the lamp 14 contacts and is enveloped by the body of the lightpipe 12. Preferably, the lamp 14 extends from each end of the passage 24, such that the lower lighting level inherent at the ends of the lamp 14 will not adversely effect the uniformity of the illumination effect of the device 10.

The material from which the lightpipe 12 is formed is also specifically tailored for use with the fluorescent lamp 14. In particular, the lightpipe 12 is preferably formed from a material which readily transmits light, such that the lightpipe 12 is characterized as being transparent or at least translucent. A particularly suitable transparent material for this purpose is a polycarbonate resin, such as LEXAN available from GE Plastics, though it is foreseeable that other suitable materials, such as an acrylic resin, could also be used. In use, such materials have been determined to produce an aesthetically pleasing appearance for a display, with the coloration of the lighting effect being dependent on the type of fluorescent lamp 14 used.

For example, in one embodiment the lamp 14 is a "white" lamp, denoting that the lamp 14 predominantly emits radiation in the visible spectrum (i.e., wavelengths of about 370 nm to about 730 nm). The resulting lighting effect of the "white" lamp and the preferred polycarbonate resin produces a very clear and crisp white backlighting effect. If desired, the intensity of the light output through the fingers 18 and 20 can be slightly reduced by molding the lightpipe 12 to have a rougher surface finish or alternatively, by reducing the power consumption of the lamp 14. A dye can be injected during the molding of the lightpipe 12, such that a specific backlighting color can be produced to match a color scheme of an automobile's passenger compartment.

Alternatively, the lamp 14 can be of the type referred to as a ultraviolet (UV) lamp which emits radiation predominantly in the ultraviolet region. When used in conjunction with a polycarbonate lightpipe 12, the lighting effect produced has a bluish tint, but otherwise has a similar lighting intensity to that of the white lamp 14.

While the above embodiments are suitable for many applications, in a preferred embodiment of this invention the material from which the lightpipe 12 is formed is capable of intensifying the appearance of the lighting effect of the fluorescent lamp 14. In particular, such a material is sensitive to ultraviolet radiation, such that the material absorbs the ultraviolet radiation emitted by a UV fluorescent light source, and then converts the shorter ultraviolet waves to longer visible waves, which are emitted by the lightpipe 12. A particularly suitable material for this purpose is a fluorescent dye-injected polycarbonate. The preferred fluorescent dye is commercially available from the Mobay Corporation under the name LISA. Specifically, LISA is a dyed light collecting and transmitting polymer based on polymethylmethacrylate, and is capable of conducting light within the material and re-emitting a large proportion of the light, with the emitted light being concentrated at the edges of a lightpipe formed from the material. In use, the LISA polymer is mixed with a suitable host material, such as polycarbonate, to form the lightpipe 12. The LISA polymer is available in several colors, such that the backlighting color can be matched with the color scheme of an automobile's passenger compartment.

Accordingly, use of the LISA material for the lightpipe 12 in conjunction with the use of the fluorescent lamp 14 advantageously produces highly desirable backlighting characteristics. In particular, if the lamp 14 is an ultraviolet lamp, the resulting lighting effect is very uniform with high intensity in terms of brightness and color. Alternatively, combining the LISA material with a white fluorescent lamp 14 yields a very uniform backlighting effect.

During preliminary testing of incandescent and fluorescent lamps, it was determined that, under identical test conditions using an identical block of lightpipe material, white and UV fluorescent lamps provided a more uniform backlighting effect. Based on these results, testing was performed using white and UV fluorescent lamps and rectangular-shaped lightpipes. A lightpipe was formed from polycarbonate in which the LISA polymer was dispersed, while another lightpipe was formed from polycarbonate without the LISA polymer. The "LISA lightpipe" had a thickness of about four millimeters, a length of about eighteen centimeters and a width of about five centimeters, while the "polycarbonate lightpipe" had a thickness of about ten millimeters, a length of about thirteen centimeters and a width of about five centimeters. Lamps were placed immediately behind each lightpipe, so as to contact the lightpipe, with the ends of the lamps extending beyond the end of the lightpipes to avoid deceptively nonuniform readings as a result of the low lighting levels emitted at the ends of fluorescent lamps. The lamps were operated with a 12 volt source at about 10 milliamps, and light intensities were measured in candelas per square meter ($cd/m^2$) at distances of 1, 4, 7, 10 and 12 centimeters from the left hand side of the lightpipes. The results were as follows.

| LAMP TYPE | LIGHTPIPE MATERIAL | INTENSITY ($cd/m^2$) | | | | |
|---|---|---|---|---|---|---|
| | | 1 cm | 4 cm | 7 cm | 10 cm | 12 cm |
| UV | none | 588 | 529 | 630 | 632 | 538 |
| UV | LISA | 204 | 210 | 228 | 224 | 216 |
| UV | Polycarbonate | 374 | 444 | 494 | 427 | 383 |
| White | none | 6470 | 6650 | 6750 | 6600 | 6300 |
| White | LISA | 716 | 647 | 734 | 703 | 788 |
| White | Polycarbonate | 4580 | 4250 | 4150 | 4480 | 4240 |

The above results indicated that uniform intensities were achieved with each combination. The combination of the fluorescent white lamp and the polycarbonate lightpipe appeared to be most efficient for achieving a true white light, while the UV fluorescent lamp and the polycarbonate lightpipe produced a vivid bluish white light. In contrast, the LISA lightpipe produced a very desirable, crisp and clean image whose color was dependent on the LISA polymer.

From the above, it can be seen that a significant advantage of this invention is that by using the light source and lightpipe of this invention, a display panel of backlit components will exhibit substantially equal backlighting intensities. More particularly, suitable uniformity and intensity within a display group of buttons can be achieved with a single fluorescent lamp 14 due to the configuration of the lightpipe 12 and the lighting characteristics of the fluorescent lamp 14.

Another advantage of the present invention is the capability for producing an aesthetically pleasing backlighting effect for a display panel. For example, in accordance with this invention, the combination of a UV fluorescent lamp and a polycarbonate lightpipe produces a bluish white light which is suitably vivid for many applications, while the combination of a UV fluorescent lamp and a lightpipe made from the LISA material produces a bright and crisp light whose color corresponds to the particular LISA polymer used. The backlighting effect of this combination is enhanced in part due to the sensitivity of the LISA material to ultraviolet radiation emitted by the UV fluorescent lamp.

The backlighting effect of this combination can be further altered by utilizing a dye during the manufacture of the lightpipe, such that the dye alters the color of the light emitted behind the backlit components. Notably, use of the dye eliminates the previous requirement for color appliques and light filters used with incandescent lamps.

In addition, higher lighting intensities are achieved for the same power consumption with the fluorescent lamp of this invention as compared to conventional incandescent lamps, yet with a lower operating temperature and therefore a reduced requirement for heat dissipation. Furthermore, the fluorescent light source is generally a more reliable light source, with the potential for a long service life as compared to conventional incandescent lamps.

Accordingly, the backlighting device of this invention is capable of alleviating many of the disadvantages encountered with the use of the incandescent light sources in the prior art. While our invention has been described in terms of a preferred embodiment, it is apparent that other forms could be adopted by one skilled in the art, for example by adopting processing method other than those suggested here, or by substituting appropriate materials. Accordingly, the scope of our invention is to be limited only by the following claims.

The embodiments of the invention in which an exclusive property or privilege is claimed are defined as follows:

1. A backlit instrument display panel comprising:
   a plurality of buttons, at least one of the buttons comprising a translucent portion and an insignia;
   a lightpipe comprising a body having first and second portions, the lightpipe further comprising fingers projecting from the first portion of the body, each finger being adapted to transmit light from the body to one of the buttons, the body having a passage formed therein which is intermediate the first and second portions of the body, the lightpipe being formed from a translucent or transparent material; and
   a fluorescent light source disposed in the passage in the body such that the body envelops, contacts and supports at least a portion of the fluorescent light source;
   wherein light emitted from the fluorescent light source is transmitted through the lightpipe to the buttons, and wherein the buttons are backlit by the lightpipe so as to be characterized by a substantially uniform backlighting intensity.

2. A backlit instrument display panel as recited in claim 1 wherein the material for the lightpipe absorbs ultraviolet radiation and converts the ultraviolet radiation to visible light which is transmitted to the backlit component.

3. A backlit instrument display panel as recited in claim 2 wherein the material for the lightpipe comprises a LISA polymer.

4. A backlit instrument display panel as recited in claim 1 wherein the material for the lightpipe is a polycarbonate resin.

5. A backlit instrument display panel as recited in claim 1 wherein the fluorescent light source is an ultraviolet fluorescent light source, the fluorescent light source emits radiation predominantly in the ultraviolet region.

6. A backlit instrument display panel as recited in claim 1 wherein the fluorescent light source emits radiation predominantly in the visible spectrum.

7. A backlit instrument display panel as recited in claim 1 further comprising fingers projecting from the second portion of the body.

8. A backlit instrument display panel as recited in claim 7 wherein the lightpipe has a substantially U-shaped cross-section, the body defining a base of the U-shaped cross-section, the fingers projecting from the first portion of the body defining a first leg of the U-shaped cross-section, and the fingers projecting from the second portion of the body defining a second leg of the U-shaped cross-section.

9. A backlit instrument display panel as recited in claim 1 wherein the passage is formed entirely within the body of the lightpipe, such that substantially all of the fluorescent light source disposed within the passage is enveloped by the body.

10. A backlit instrument display panel as recited in claim 1 wherein the lightpipe has an elongate shape, the passage being oriented longitudinally to the body.

11. A backlit instrument display panel comprising:
    an array of buttons, each of the buttons comprising a translucent portion and an insignia;
    a lightpipe having an elongate shape and a substantially U-shaped cross-section, a base of the U-shaped cross-section defining a body of the lightpipe, a first leg of the U-shaped cross-section defining a first array of fingers projecting from a first portion of the body, and a second leg of the U-shaped cross-section defining a second array of fingers projecting from a second portion of the body, each of the first and second arrays of fingers being adapted to transmit light from the body to one of the buttons of the display panel, the body having a passage formed therein which is intermediate the first and second portions of the body, the lightpipe being formed from a material which is sensitive to ultraviolet radiation; and
    a fluorescent light source disposed in the passage in the body such that substantially all of the fluorescent light source disposed within the passage is enveloped, contacted and supported by the body;
    wherein light emitted from the fluorescent light source is transmitted through the lightpipe to the buttons so as to be emitted from the insignias of the buttons, and wherein the buttons are backlit by the lightpipe so as to be characterized by a substantially uniform backlighting intensity.

12. A backlit instrument display panel as recited in claim 1 wherein the fluorescent light source emits radiation predominantly in the ultraviolet region.

* * * * *